United States Patent  [15] 3,692,741
Price et al.  [45] Sept. 19, 1972

[54] METAL 2,5-DIMETHOXY CINNAMIC SALTS AS CATALYSTS-OPTICAL BRIGHTENERS FOR POLYESTER RESINS

[72] Inventors: John A. Price, Swarthmore, Pa. Mary J. Stewart, Media, Pa.

[73] Assignee: FMC Corporation, Philadelphia, Pa.

[22] Filed: July 15 1970

[21] Appl. No.: 55,266

Related U.S. Application Data

[63] Continuation-in-part of Ser. No. 886,757, Dec. 19, 1969, abandoned.

[52] U.S. Cl.............260/47 C, 260/45.75 R, 260/75 R
[51] Int. Cl. ...........................................C08g 17/013
[58] Field of Search...260/47 C, 47 U, 47 UP, 45.75, 260/45.85

[56] References Cited

UNITED STATES PATENTS 3,030,208   4/1962   Schellenberg et al........260/47 UP UX
3,344,115   9/1967   Rein..........................260/47 C

OTHER PUBLICATIONS pp. 220 and 225, Journal American Chemical Society Vol. 79 Jan. 5, 1957 Article by Anliker et al.

*Primary Examiner*—Melvin Goldstein
*Attorney*—Thomas R. O'Malley, George F. Mueller and Charles A. Haase

[57]   ABSTRACT

Metal salts of 2,5-dimethoxy cinnamic acid and polyester resins comprising the condensation polymerization product of (a) a lower alkyl diester of a dicarboxylic acid, (b) an aliphatic diol, and (c) a minor amount of a manganese, cobalt, or zinc salt of 2,5-dimethoxy cinnamic acid.

4 Claims, No Drawings

METAL 2,5-DIMETHOXY CINNAMIC SALTS AS CATALYSTS-OPTICAL BRIGHTENERS FOR POLYESTER RESINS

This application is a continuation-in-part of our copending U.S. application, Ser. No. 886,757, filed Dec. 19, 1969 now abandoned.

This invention relates to highly polymeric optically bright linear polyester resins which are prepared by a transesterification and polycondensation process.

The highly polymeric linear polyester resins of the present invention are known as saturated linear polyesters and can be homo- or copolymeric. These resins can be used for fiber- and film-forming purposes. It is known in the prior art that saturated linear polyester resins can be prepared by carrying out a transesterification reaction between a lower alkyl diester of a dicarboxylic acid, which does not contain any ethylenic unsaturation and a suitable lower aliphatic diol to form a prepolymer. The resulting prepolymer is then polycondensed in the presence of a polycondensation catalyst to form the desired polyester resin.

From a commercial standpoint, it is essential that polyester resins suitable for melt spinning into shaped articles such as filaments should have a carboxyl value of below 50 equivalents per million grams (eq./$10^6$ gr. of meq./kg.), an intrinsic viscosity preferably not less than about 0.60 (determined in a 60 percent phenol-40 percent tetrachloroethane solution, wt./wt., at 30° C.), and a diethylene glycol content preferably less than about 1 percent by weight in order for the shaped articles formed therefrom to possess a high level of hydrolytic stability, thermal stability, and a high degree of tenacity. It is also essential for most uses that such polyester resins should exhibit substantially no off-color.

When polyester and copolyester resins are to be used for filament-forming purposes, it is necessary that such resins exhibit what is considered good color. For instance, quite often polyester and copolyester resins produced by the above-denoted procedures will exhibit a yellow tinge or off-white color which will make the resins unsatisfactory for use in the preparation of filaments for utilization in the manufacture of fabrics.

It is known that it is often desirable to optically brighten polyester resin products by means of a brightening or whitening agent which will impart a generally blue fluorescence to the resin product under the ultraviolet light components of daylight. This optical brightening action is the result of the ability of the brightening compound to convert the ultraviolet light components of daylight to visible blue components which counteract the undesired yellow tinge or off-white color of the resin products.

Therefore, it is an object of the present invention to prepare highly polymeric linear polyester resins by a transesterification and polycondensation process.

It is another object of the present invention to prepare highly polymeric polyester resins which exhibit improved optical brightness.

These and other objects are accomplished in accordance with the present invention with polyester resins comprising the condensation polymerization reaction product of (a) a lower alkyl diester of a dicarboxylic acid, (b) an aliphatic diol, and (c) a minor amount of a metal salt of 2,5-dimethoxy cinnamic acid wherein the metal is selected from the group consisting of manganese, cobalt, and zinc.

More particularly, the polyester resin compositions of the present invention are prepared by a method comprising carrying out a transesterification reaction between a lower alkyl diester of a saturated dicarboxylic acid and a saturated aliphatic diol in the presence of a minor amount of a metal salt of 2,5-dimethoxy cinnamic acid wherein the metal is selected from the group consisting of manganese, cobalt, and zinc to form a prepolymer and then polycondensing said prepolymer in the presence of a conventional polycondensation catalyst. The metal 2,5-dimethoxy cinnamates of the present invention function both as a transesterification catalyst and as an optical brightening modifying monomer.

The metal 2,5-dimethoxy cinnamates used to prepare the present polyester resins can be represented by the following general formula:

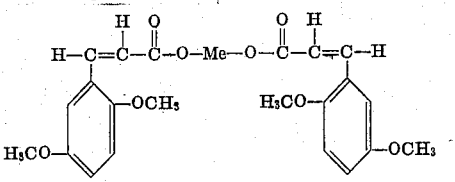

wherein Me is a metal selected from the group consisting of manganese (II), cobalt (II), and zinc (II).

The subject cinnamates can be prepared by first reacting 2,5-dimethoxy cinnamic acid with an alkali metal hydroxide to form the corresponding alkali metal salt of said acid and then reacting this salt with manganese, cobalt or zinc chloride so as to displace or substitute the alkali metal ions with Mn, C or Zn ions and thereby form the corresponding Mn, Co or Zn 2,5-dimethoxy cinnamate.

The following Example A will further illustrate the preparation of the metal 2,5-dimethoxy cinnamates of the present invention.

EXAMPLE A 2.4 Grams (0.1 mole) of anhydrous lithium hydroxide (LiOH) was dissolved in 50 ml. of water. 20.8 Grams (0.1 mole) of 2,5-dimethoxy cinnamic acid was added to the above solution and the combined mixture was further diluted to 200 mls. with water. The resulting mixture was then warmed to dissolve the solids. To 100 mls. of this solution was added 8 mls. of an aqueous solution containing 3.4 grams (0.025 mole) of zinc chloride ($ZnCl_2$). A heavy white precipitate formed immediately. This precipitate was filtered off and washed with water, and then methanol, and dried at 70° C. for 4 hours. The product formed was identified as the zinc salt of 2,5-dimethoxy cinnamic acid.

The manganese and cobalt salts of 2,5-dimethoxy cinnamic acid are prepared with the process steps of Example A above by using manganese (II) chloride or cobalt (II) chloride in place of the zinc chloride.

Specifically, any saturated linear polyester resin can be enhanced with regard to optical brightness by employing one or more of the above-described cinnamates in the preparation of polyester resins by a transesterification or ester-interchange process.

The present optical brightening and transesterification catalyst component described above is combined with the diester and diol components that are to be used to form the polyester so that it will eliminate the need for any other transesterification catalyst. However, if desired or indicated, other known transesterification catalysts can be used in combination with one or more of the above-described cinnamates.

In general, in accordance with the present invention, the above-described metal 2,5-dimethoxy cinnamates can be polymerized with any lower alkyl diesters of dicarboxylic acids which do not contain any ethylenic unsaturation that are commonly used to prepare polyester resins. The lower alkyl groups of such diesters contain from one to six carbon atoms. For example, among those that can be used are dimethyl terephthalate, dimethyl isophthalate, dibutyl-p,p'-sulfonyl dibenzoate, sodium 3,5-di-(carboxymethoxy) benzenesulfonate, as well as the lower alkyl diesters of 1,4-naphthalene dicarboxylic acid, 1,6-naphthalene dicarboxylic acid, and 4,4'-diphenyl dicarboxylic acid or any combination thereof.

Among the diols that can be used in the preparation of the subject polyester resins are any of the saturated aliphatic diols. For example, any of those represented by the formula: $HO(CH_2)_nOH$, wherein $n$ is from 2 to 10, can be used. Additionally, the gem-dialkyl glycols and others can be used. For illustration purposes, suitable diols include ethylene glycol, butylene glycol, hexamethylene glycol, decamethylene glycol, 2,2-dimethyl-1,3-propanediol, 2,2-dipropyl-1,5-pentanediol, 2,2-dimethyl-1,4-butanediol, and cyclohexanedimethanol.

It has been found that the metal 2,5-dimethoxy cinnamates of the present invention are effective in catalyzing the transesterification reaction and in bringing about the desired optical brightening effect when used in amounts ranging from about 0.01 weight percent to about 3.0 weight percent, based on the weight of the diester being transesterified. However, in most instances, it has been found that it is preferred to use amounts ranging from about 0.02 weight percent to about 1.0 weight percent. Obviously, larger or smaller amounts can also be used. However, it has been determined that when concentrations greater than 3.0 weight percent, based on the weight of the diester reactant are used, no additional advantage is achieved; whereas, when concentrations less than 0.01 weight percent are used, its effectiveness is noticeably diminished.

The preparation of the subject polyester resins via the ester-interchange or transesterifiction reaction is generally carried out with a molar ratio of diol to diester of from about 1.2:1 to about 2.6:1. The transesterification reaction is generally carried out at atmospheric pressure in an inert atmosphere such as nitrogen at a temperature range of from about 125° to 250° C., but preferably from about 150° to 250° C. During the first part of this reaction, the respective alkanol is evolved and continuously removed by distillation. After a reaction period of from about 1 to 2 hours, the temperature of the reaction mixture is raised from about 200° C. to 300° C. for approximately 1 to 3 hours in order to complete the transesterification reaction and form the desired polyester prepolymer and distill off any excess diol which may be present.

The polycondensation step used in the preparation of the present polyester resins is accomplished by adding a conventional polycondensation catalyst such as antimony oxalate or germanium dioxide to the polyester prepolymer and heating the blend thereof under reduced pressure within the range of about 0.05 mm. to 20 mm. of mercury while agitated at a temperature of from about 260° to 325° C. for from 2 to 4 hours. The polycondensation catalysts are generally employed in amounts ranging from about 0.01 percent to about 0.2 percent, based on the weight of the prepolymer to be polycondensed. Usually, it has been found that from about 0.02 percent to 0.1 percent of the polycondensation catalysts are preferred in most instances.

Additionally, other known additives such as thermal stabilizers can be added to the present reaction mixtures. For example, triphenyl phosphite and others can be incorporated into the present resins for enhancing their heat stability.

The following examples will further serve to illustrate the present invention.

EXAMPLE I six hundred Grams of Dimethyl terephthalate, 396 mls. of ethylene glycol, and 0.24 gram of zinc acetate was charged into a reaction vessel equipped with a nitrogen inlet, heating means and stirring means. The reaction mixture was agitated and heated at atmospheric pressure to about 197° C. under a nitrogen atmosphere. The reaction mixture was held at about 197° C. for about 2 hours during which time methyl alcohol was distilled off. After approximately 80 percent of the calculated methyl alcohol was distilled, the temperature was increased to 230° C. over a period of about one hour to distill off any remaining by-product methyl alcohol and any excess glycol and form a polyester prepolymer. The prepolymer product was then allowed to cool under an atmosphere of nitrogen.

Fifty grams of the prepolymer product made above in this example was mixed with 0.38 mls. of a 5 percent triphenyl phosphite solution in ethylene glycol and 0.02 grams of antimony trioxide in a reaction vessel. This reaction mixture was then heated to about 280° C. at about 0.1 mm. of mercury while under agitation for about 1 ½ hours to bring about the polycondensation of the prepolymer to form a polyester resin.

EXAMPLE II

Three hundred Grams of dimethyl terephthalate, 198 mls. of ethylene glycol, and 0.12 gram of zinc 2,5-dimethoxy cinnamate was charged into a reaction vessel equipped with a nitrogen inlet, heating means and stirring means. The reaction mixture was agitated and heated at atmospheric pressure to about 197°C. under a nitrogen atmosphere. The reaction mixture was held at about 197°C for about two hours during which time methyl alcohol was distilled off. After approximately 80 percent of the calculated methyl alcohol was distilled, the temperature was increased to 230° C. over a period of about one hour to distill off any remaining by-product methyl alcohol and any excess glycol and form a polyester prepolymer. The prepolymer product was then allowed to cool under an atmosphere of nitrogen.

Fifty grams of the prepolymer made above in this example was mixed with 0.17 mls. of a 5 percent triphenyl phosphite solution in ethylene glycol and 0.02 gram of antimony trioxide in a reaction vessel. This reaction mixture was then heated to about 280° C. at about 0.1 mm. of mercury while under agitation for about 1 ½ hours to bring about the polycondensation of the prepolymer to form a polyester resin.

The polyester resins prepared above in Examples I and II possessed the properties set forth below in the Table. The "half-time" of the transesterification stages of the resins prepared are also indicated.

TABLE

| Resin Sample | Half-Time (minutes) | I.V.[1] | Percent DEG[2] | Carboxyl Content[3] | UV Rating[4] |
|---|---|---|---|---|---|
| Ex. I | 16 | 0.59 | 0.75 | 5 | F |
| Ex. II | 23 | 0.60 | 0.31 | 6 | A |

[1]Intrinsic Viscosity determined in a 60% phenol-40% tetrachloroethane solution, wt./wt., at 30°C.
[2]Diethylene Glycol Content—Weight Percent
[3]Expressed as equivalents per million grams of resin
[4]Optical Brightening Rating In the result set forth above in the Table, an optical brightness rating of "A" indicates that the polyester resin exhibits bright fluorescence under ultraviolet light. The letter "F" indicates that the resin exhibited no fluorescence under ultraviolet light.

The term "half-time" as used above is defined as the time necessary for the first half of the theoretical amount of methyl alcohol that will be produced during the transesterification reaction to distill from the transesterification mixture.

The process and type product obtained by the method illustrated in Example II are also readily obtained with the use of manganese 2,5-dimethoxy cinnamate and cobalt 2,5-dimethoxy cinnamate.

With the use of the present invention, polyester resins are obtained through a transesterification and polycondensation process, which exhibit excellent properties for filament- and film-forming purposes. The resins of the present invention are particularly useful, due to the fact that the primary ester units of the basic polyester need only be modified to a slight degree with the subject combination optical brightener and transesterification catalyst in order to achieve the desired results. Further, the optical brighteners of the present invention tend to become an integral part of the polymer backbone; and hence, the resulting improved polyester resin will be extremely resistant to washing, ironing, and other handling to which fabrics made from such polyester may be subjected.

We claim:

1. The highly polymeric resinous linear copolyesters of (a) dimethyl terephthalate, (b) an aliphatic glycol having two to 10 carbon atoms and (c) a minor amount of from about 0.01 weight percent to about 3.0 weight per cent, based on the weight of said diester of a metal salt of 2,5-dimethoxy cinnamic acid wherein the metal is a member from the group consisting of manganese, cobalt, and zinc.

2. A composition of claim 1 wherein (c) is manganese 2,5-dimethoxy cinnamate.

3. A composition of claim 1 wherein (c) is cobalt 2,5-dimethoxy cinnamate.

4. A composition of claim 1 wherein (c) is zinc 2,5-dimethoxy cinnamate.

* * * * *

UNITED STATES PATENT OFFICE
CERTIFICATE OF CORRECTION

Patent No. 3,692,741      Dated 19 September 1972

Inventor(s) John A. Price and Mary J. Stewart

It is certified that error appears in the above-identified patent and that said Letters Patent are hereby corrected as shown below:

Col. 2, line 33, "C" should read -- Co --

Signed and sealed this 20th day of February 1973.

(SEAL)
Attest:

EDWARD M. FLETCHER, JR.
Attesting Officer

ROBERT GOTTSCHALK
Commissioner of Patents